US009865259B1

(12) United States Patent
Typrin et al.

(10) Patent No.: US 9,865,259 B1
(45) Date of Patent: Jan. 9, 2018

(54) SPEECH-RESPONSIVE PORTABLE SPEAKER

(71) Applicant: Amazon Technologies, Inc., Seattle, WA (US)

(72) Inventors: Marcello Typrin, Menlo Park, CA (US); Steve Hoonsuck Yum, Sunnyvale, CA (US); Chris Stewart Hagler, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/458,601

(22) Filed: Mar. 14, 2017

Related U.S. Application Data

(63) Continuation of application No. 14/611,853, filed on Feb. 2, 2015, now Pat. No. 9,633,661.

(51) Int. Cl.
*G10L 17/00* (2013.01)
*G10L 15/22* (2006.01)
*G10L 15/02* (2006.01)
*G10L 15/30* (2013.01)

(52) U.S. Cl.
CPC .............. *G10L 15/22* (2013.01); *G10L 15/02* (2013.01); *G10L 15/30* (2013.01); *G10L 2015/223* (2013.01)

(58) Field of Classification Search
CPC ......... G10L 15/22; G10L 15/26; G06F 3/167; H04M 2201/40
USPC ....................................................... 704/275
See application file for complete search history.

(56) References Cited

U.S. PATENT DOCUMENTS

| | | | |
|---|---|---|---|
| 5,983,186 A | 11/1999 | Miyazawa et al. | |
| 6,070,140 A | 5/2000 | Tran | |
| 6,163,768 A | 12/2000 | Sherwood et al. | |
| 8,452,597 B2 | 5/2013 | Bringert et al. | |
| 2004/0172258 A1 | 9/2004 | Dominach et al. | |
| 2007/0011007 A1* | 1/2007 | Greene ................ | G11B 19/02 704/246 |
| 2007/0136446 A1 | 6/2007 | Rezvani et al. | |
| 2008/0208589 A1* | 8/2008 | Cross ..................... | G10L 15/26 704/275 |
| 2010/0318366 A1 | 12/2010 | Sullivan et al. | |
| 2011/0305357 A1* | 12/2011 | Wells .................... | H04R 1/025 381/301 |

(Continued)

OTHER PUBLICATIONS

Office action for U.S. Appl. No. 14/611,853, dated May 18, 2016, Typrin et al., "Speech-Responsive Portable Speaker", 10 pages.

(Continued)

*Primary Examiner* — Jesse Pullias
(74) *Attorney, Agent, or Firm* — Lee & Hayes, PLLC

(57) ABSTRACT

An electronic device may operate in different modes of operations. In a first mode of operation, the electronic device may receive user speech via a microphone, generate an audio signal that represents the user speech, and then send the audio signal to one or more remote computing device for analysis. In a second mode of operation, the electronic device may receive audio data from a peripheral device and then output audible content represented by the audio data. In some instances, the electronic device may operate in the first mode of operation and/or the second mode of operation based on whether the electronic device can communicate with the one or more computing devices over a wide-area network.

20 Claims, 8 Drawing Sheets

(56) References Cited

U.S. PATENT DOCUMENTS

2013/0085755 A1    4/2013   Bringert et al.

OTHER PUBLICATIONS

Office action for U.S. Appl. No. 14/611,853, dated Sep. 20, 2016, Typrin et al., "Speech-Responsive Portable Speaker", 13 pages.

* cited by examiner

SPEECH-RESPONSIVE PORTABLE SPEAKER

RELATED APPLICATIONS

This patent application is a continuation of U.S. patent application Ser. No. 14/611,853, filed Feb. 2, 2015, and entitled "Speech-Responsive Portable Speaker," which is incorporated herein by reference.

BACKGROUND

As the processing power available to devices and associated support services continues to increase, it has become practical to interact with devices in new ways. In particular, it has become practical to interact with devices through speech dialogs, in a which user instructs a system by voice. However, the resources required to implement more sophisticated interaction methods often use more electrical power, making it difficult to implement such methods in battery-operated devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A portable music device may be configured in conjunction with a network-based speech support service server to implement a speech interface and to play music in response to spoken user commands.

The portable music device has a talk button that the user presses when speaking a command. While the talk button is pressed, the portable music device captures user audio and provides the user audio to the speech support service server. The speech support service server performs automatic speech recognition (ASR) and natural language understanding (NLU) to determine which audio content the user wants to play. Upon identifying the audio content, the portable music device streams the audio content from a network-based content source and plays the audio content on one or more speakers of the portable music device.

The portable music device may have a rechargeable battery so that the device can be used without connection to an external power source. However, the device may also be used with a charging dock that provides external electrical power for battery recharging.

When the portable music device is docked and/or receiving external power, the device may activate enhanced capabilities. As an example, the portable music device may itself may have speech processing capabilities, such as wakeword detection, ASR, and/or NLU, that are activated only when the device is receiving power from an external source. As a more specific example, the device may use wakeword detection when docked and receiving external power, so that the user is not required to press the talk button in order to direct speech to the device. Rather, the portable music device continually monitors sound within its environment, detects a user utterance of a wakeword, and subsequently captures user audio and provides the user audio to the speech support service server for further analysis.

As another example, the device may activate device-supported ASR features when receiving external power and may respond to certain types of user speech without relying on network-based speech support services, which may at times introduce undesirable latencies.

Figure 1:
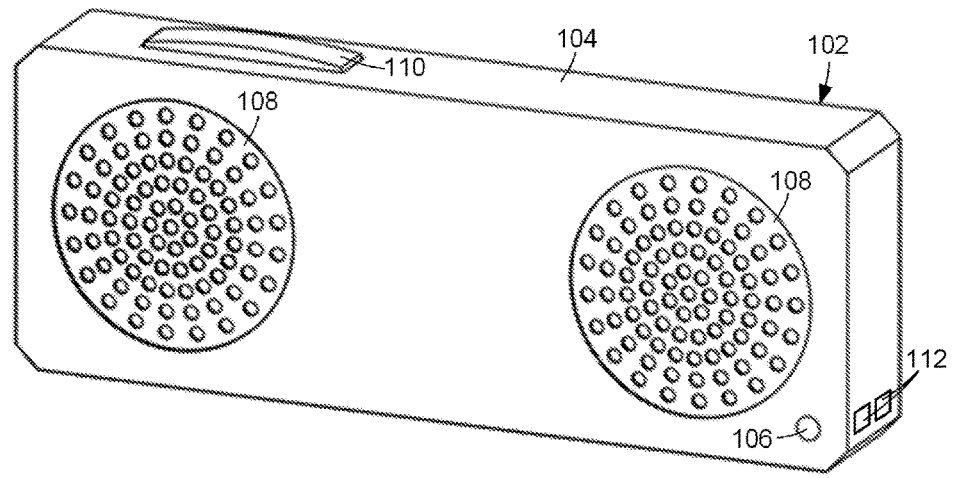
FIG. 1 shows an example of a battery-operated portable music device that implements a speech interface.

FIG. 1 shows an example portable music device 102. The music device 102 comprises a housing 104 that supports a microphone 106, one or more speakers 108, and a talk button 110. The talk button 110 may also be referred to as a talk actuator or a push-to-talk (PTT) button.

The music device 102 may be designed and configured to rest horizontally on a surface, with the speakers 108 facing a user. In addition, the device 102 may be designed for handheld use during which a user holds the device 102 and speaks into the microphone 106 while pressing the talk button 110. The music device 102 may be configured so that the talk button 110 is easily accessed by a user's thumb when holding the music device 102 near the user's mouth.

The microphone 106 may be selected and/or designed for sensitivity to near-field audio so as to capture user speech when the microphone 106 is held near the mouth of the user. The microphone 106 generates an audio signal that contains the user speech.

The portable music device 102 may be powered by a rechargeable internal battery (not shown) for cordless operation. The device 102 may have contacts or ports 112 that can receive external power by means of a charging dock or cradle in order to charge the internal battery and/or to operate from household power mains.

Figure 2:
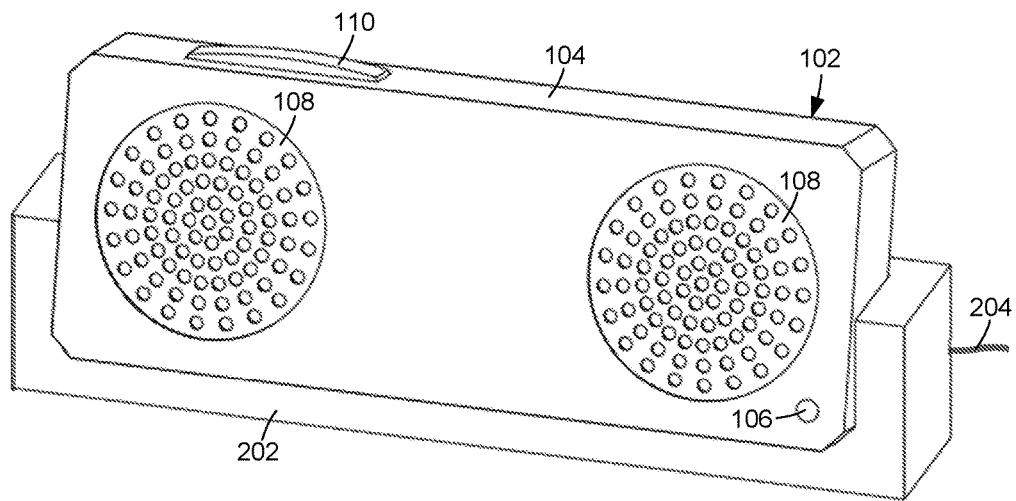
FIG. 2 shows the example portable music device being used with a charging dock that provides external power.

FIG. 2 illustrates a charging dock 202, also referred to as a charging dock or docking station, which may be used with the portable music device 102. The charging dock 202 is designed to rest on a horizontal surface such as a table or desktop and to receive the music device 102. The music device 102 may be placed within and supported by the charging dock 202. The charging dock 202 is connected by power cable 204 to an external power source such as a power mains or a direct-current (DC) adapter that is connected to the power mains. For example, a DC adapter may connect to a 110 volt alternating current (AC) power mains and may produce DC power in the range of 5 to 20 volts. An adapter such as this may be referred to as an AC-DC adapter. The DC power is provided through the power cable 204 to the charging dock 202. The charging dock 202 is configured to provide the external DC power to the device 102 through the contacts 112 of the device 102.

The portable music device 102 and accompanying charging dock 202 shown in FIGS. 1 and 2 are examples of many possible physical configurations, which may include different shapes, different components, and different component placements. In some embodiments, the device 102 may have buttons or other controls in addition to the talk button 110, such as a power button, volume buttons, play control buttons, etc. In some cases, the music device 102 may have a graphics display for presentation of information to the user. The device 102 may also have communications ports and/or electrical connections that are not shown.

The portable music device 102 is configured to capture and respond to user speech. Specifically, the user may verbally request particular music to be played by the portable music device 102. The portable music device 102 responds to the request by playing the music on the speakers 108. In certain situations, the user may need to press the talk button 110 when speaking a request. In other cases, the user may indicate a request by prefacing the request with a predefined keyword, which is also referred to herein as a wakeword or trigger expression. More specifically, the music device 102 may rely on the talk button to detect spoken user requests when the music device 102 is operating from battery power and may enable wakeword detection only when the music device 102 is receiving external power. Disabling wakeword detection when operating on battery power reduces computational activities and power consumption, thereby increasing battery life.

The portable music device 102 may be supported by network-based services such as speech support services that perform ASR and NLU on audio captured by the microphone 106 and that provide instructions to the portable music device 102 in response to recognized speech. This allows relatively sophisticated audio and speech processing to be performed despite limited processing capabilities of the portable music device 102 itself.

In some cases, however, the portable music device 102 may have at least limited speech recognition capabilities that are activated and utilized when the portable music device 102 is receiving external power. In various embodiments, different levels of speech support may be provided by the device 102 when receiving external power, such as ASR, NLU, and speech synthesis. Performing these functions locally avoids delays and latencies that may otherwise be introduced by interacting with network-based services.

The portable music device 102 may be configured to operate in multiple playback modes to play audio content such as music and in some cases to also control the playing of audio content by peripheral devices. In one playback mode, the portable music device 102 acts as a peripheral speaker for a personal media device such as a smartphone, tablet computer, or other device that may be configured to act as a personal media storage device. In this mode, referred to as a peripheral mode, the device 102 receives an audio stream over a device-to-device wireless connection such as a Bluetooth® connection and passively plays the received audio stream on the speakers 108. The audio stream may contain music or other audio content that has been selected through a user interface of the personal media device, apart from the speech interface of the portable music device 102.

In another playback mode, referred to herein as a voice control mode, the portable music device 102 implements a speech interface through which the user selects and plays music by speaking commands to the device 102. In some embodiments, the voice control mode is used only during those times during which the device 102 the device 102 has broadband Internet connectivity. During other times, the portable music device operates in the peripheral mode.

When operating in the voice control mode, the user speaks a verbal command into the microphone 106 while actuating the talk button 110. The user speech is analyzed and interpreted to identify particular music or other audio content that the user wants to play. The identified content is then obtained and/or played by the device 102. During times when the portable music device 102 is receiving external power, the user may preface a verbal command with a wakeword and may not need to press the talk button 110.

By default, content identified in this manner is played on the speakers 108 of the device 102. However, the device 102 may also be configured to provide the content to available peripheral devices such as Bluetooth speakers or other speaker peripherals that are nearby. For example, the device 102 may be configured to play music using the sound system of an automobile during times in which the device 102 is within the automobile. Similarly, the device 102 may be configured to play music using a home audio system during times in which the device 102 is within the home.

In some embodiments, the portable music device 102 may be configured to actively and automatically determine whether it is near any peripheral devices and to play audio content using peripheral devices that are in the proximity of the user and/or of the device 102.

Figure 3:
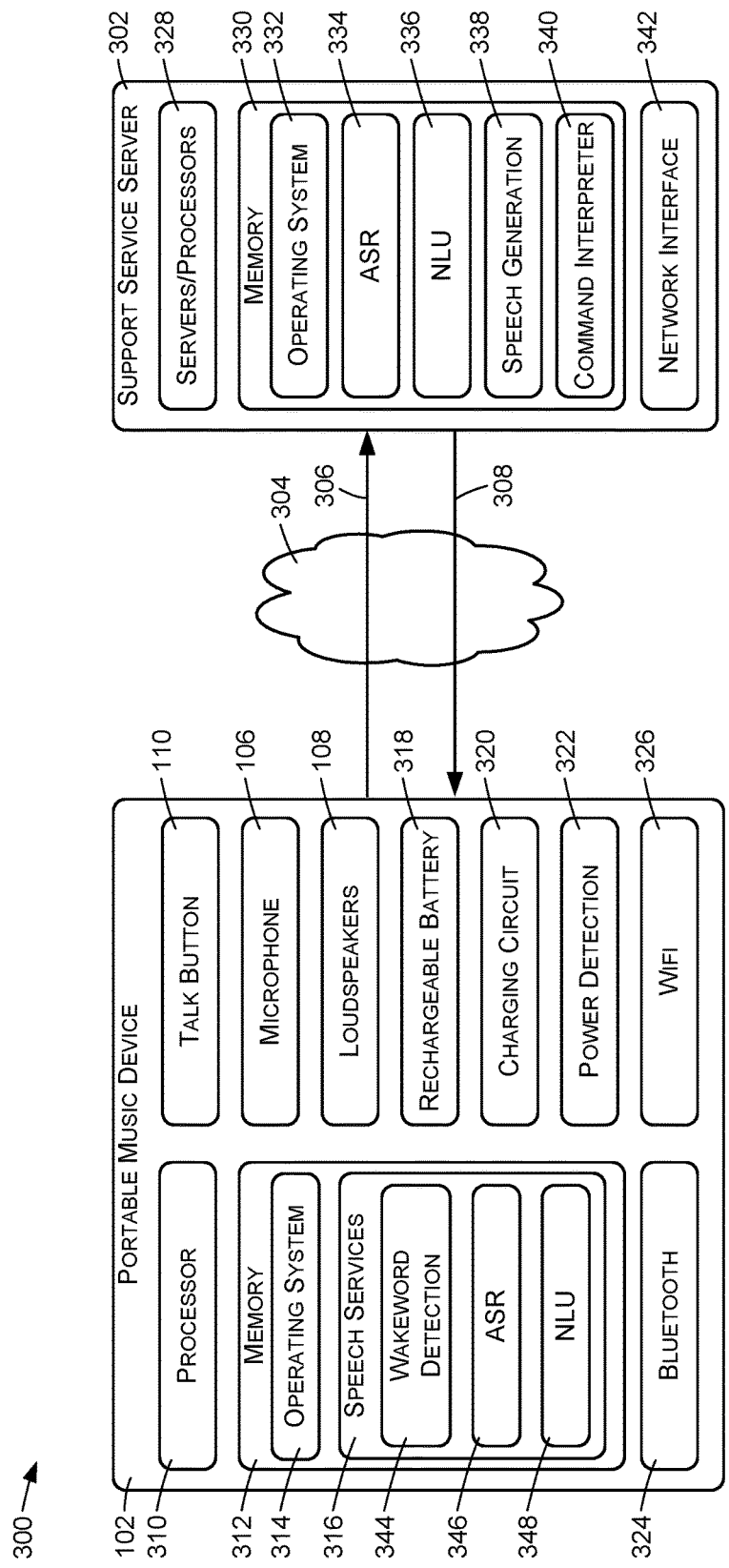
FIG. 3 is a block diagram showing the example portable music device being used with the support of a speech support service server.

FIG. 3 shows an example system 300 of which the portable music device 102 may be a part. The system includes the portable music device 102 and a network-accessible speech support service server 302. The speech support service server 302 may be implemented as a network-based or cloud-based service that is located remotely or external to the portable music device 102. For example, the speech support service server 302 may be implemented by a business organization and/or service provider to support multiple music devices 102 that are located in different user premises, which in turn may be located in widely varying geographic locations.

The speech support service server 302 may in some instances be part of a network-accessible computing platform that is maintained and accessible via a wide-area network 304 such as the Internet. Network-accessible computing platforms such as this may be referred to using terms such as "on-demand computing", "software as a service (SaaS)", "platform computing", "network-accessible platform", "cloud services", "data centers", and so forth.

Communications between the music device 102 and the speech support service server 302 may be implemented through one or more data communication networks, including local-area networks, wide-area networks, and/or the public Internet. Cellular and/or other wireless data communications technologies may also be used to communicate with the speech support service server 302. User premises may include local network support equipment to facilitate communications with the speech support service server 302, such as wireless access points, network routers, communication hubs, etc.

In operation, the portable music device 102 provides an audio signal 306 to the speech support service server 302 in response to a user of the device 102 pressing the talk button 110. The speech support service server 302 analyzes the audio signal 306 to detect user speech, to determine the meaning of the user speech, and to provide a response signal 308 that contains or indicates an appropriate response to the meaning of the user speech. The response signal 308 may indicate actions or functions that the portable music device 102 is to perform. Alternatively, or in addition, the response signal 308 may comprise an audio signal containing audio that is to be rendered by the portable music device 102. For example, the audio may comprise generated speech or requested audio content such as music.

The portable music device 102 has operational logic, which in the illustrated example comprises a processor 310 and associated memory 312. The processor 310 may include multiple processors and/or a processor having multiple cores. The processor 310 may comprise processor extensions, co-processors, digital signal processors, and so forth.

The memory 312 may contain applications and programs in the form of computer-executable instructions that are executed by the processor 310 to perform acts or actions that implement desired functionality of the device 102, including the functionality described herein. The memory 312 may be a type of computer storage media and may include volatile and nonvolatile memory. The memory 312 may include, but is not limited to, RAM, ROM, EEPROM, flash memory, or other memory technology.

FIG. 3 shows examples of applications and/or programs that may be provided by the device 102 and stored by the memory 312 to implement functionality of the device 102, although many other applications and types of functionality may be provided in various embodiments.

The portable music device 102 may have an operating system 314 that is configured to manage hardware and services within and coupled to the device 102 and to implement the general functionality of the device 102 as described herein. In some embodiments, the memory 312 may also contain programs or applications that implement local speech services 316, which may be used during times when the device 102 is connected to an external power source such as when the device is placed in the charging dock 202. The nature and use of the local speech services 316 will be explained in more detail below.

As already described, the portable music device 102 has a microphone 106, one or more speakers 108, a talk button 110, and a rechargeable battery 318. In addition, the device 102 has a charging circuit 320 that receives electrical power from an external source such as a power mains, an AC-to-DC converter connected to the power mains, or an external DC source. The charging circuit 320 is configured to charge the rechargeable battery 318 when the device 102 receives external power.

The portable music device 102 may also have a power detector 322 that detects when the device 102 is receiving external electrical power and/or when the device 102 is charging the rechargeable battery 318. The power detector 322 may be configured to produce a signal to indicate that the portable music device 102 is receiving external power and is charging the rechargeable battery 318. In some embodiments, the charging detection circuit may comprise a voltage detector configured to detect the presence of a DC voltage at the contacts 112 of the device 102.

The portable music device 102 may have a device-to-device wireless communications interface, which in the illustrated embodiment comprises a Bluetooth® personal-area-networking (PAN) interface 324. The Bluetooth interface 324 may be used by the portable music device 102 to communicate with local devices such as smartphones, personal media devices, and other content sources or audio peripherals.

The portable music device 102 may also have a wireless wide-area network (WAN) communications interface such as a WiFi® interface 326. The WiFi interface 326 may be configured to communicate over the wide-area network 304 with the speech support service server 302. More generally, the portable music device 102 and/or the speech support service server 302 may communicatively couple to the wide-area network 304 via radio frequency (RF), cellular, mobile telephone networks, satellite, Bluetooth®, Wi-Fi, or other connection technologies. The network 304 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, Wi-Fi, etc.), and/or other connection technologies.

The speech support service server 302 comprises operational or control logic, which may comprise one or more servers, computers, and/or processors 328 and associated memory 330 containing applications and programs in the form of instructions that are executed by the servers, computers, or processors 328 to perform acts or actions that implement desired functionality of the speech support service server 302, including the functionality specifically described herein. The memory 330 may be a type of computer storage media and may include volatile and non-volatile memory. Thus, the memory 330 may include, but is not limited to, RAM, ROM, EEPROM, flash memory, or other memory technology. In certain implementations, the speech support service server 302 may comprise a plurality of servers configured to support and communicate with multiple portable music devices 102 over the Internet.

The speech support service server 302 may have an operating system 332 that is configured to manage components and services of the speech support service server 302. Among other software components that are not shown, the speech support service server 302 may include an automatic speech recognition (ASR) service 334 that recognizes human speech in an audio signal provided by the portable music device 102 from the microphone 106. Software of the speech support service server 302 may also include a natural language understanding (NLU) service 336 that determines user intent based on user speech that is recognized by the ASR service 334.

The ASR service 334 may use various techniques to create a transcript of spoken words represented in an input audio signal. For example, the ASR service 334 may reference various types of models, such as acoustic models and language models, to recognize words of speech that are represented in an audio signal. In some cases, models such as these are created by training, such as by sampling and manually classifying many different types of speech.

An acoustic model may represent speech as a series of vectors corresponding to features of an audio waveform over time. The features may correspond to frequency, pitch, amplitude, and time patterns. Statistical models such as Hidden Markov Models (HMMs) and Gaussian mixture models may be created based on large sets of training data. Models of received speech are then compared to models of the training data to find matches.

Language models describe things such as grammatical rules, common word usages and patterns, dictionary meanings, and so forth, to establish probabilities of word sequences and combinations. Analysis of speech using language models may be dependent on context, such as the words that come before or after any part of the speech that is currently being analyzed.

ASR may provide recognition candidates, which may comprise words, phrases, sentences, or other segments of speech. The candidates may be accompanied by statistical probabilities, each of which indicates a "confidence" in the accuracy of the corresponding candidate. Typically, the candidate with the highest confidence score is selected as the output of the speech recognition.

The NLU service 336 analyzes a word stream provided by the ASR service 334 and produces a representation of a meaning of the word stream. For example, the NLU service 336 may use a parser and associated grammar rules to analyze a sentence and to produce a representation of a meaning of the sentence in a formally defined language that conveys concepts in a way that is easily processed by a computer. For example, the meaning may be semantically represented as a hierarchical set or frame of slots and slot values, where each slot corresponds to a semantically defined concept. Thus, the meaning of the sentence may be semantically represented by the frame of slots and slot values. NLU may also use statistical models and patterns generated from training data to leverage statistical dependencies between words in typical speech.

Software elements of the speech support service server 302 may further comprise a speech generation service 338 that synthesizes or otherwise produces speech audio. For example, the speech generation service 338 may comprise a text-to-speech (TTS) component that produces speech from text to produce speech messages to be played at the portable music device 102.

Software of the speech support service server 302 may also comprise a command interpreter and action dispatcher 340 (referred to herein simply as a command interpreter 340) that determines functions or commands corresponding to user intents. In some cases, commands may correspond to functions that are to be performed at least in part by the portable music device 102, and the command interpreter 340 may in those cases provide commands to the portable music device 102 for implementing such functions. Examples of commands or functions that may be performed by the portable music device 102 in response to directives from the command interpreter 340 include playing music or other media, increasing/decreasing the volume of the speakers 108, generating audible speech through the speakers 108, and so forth.

The speech support service server may also comprise a network interface 342 configured to communicate with the portable music device 102 over the wide-area network 304.

In some cases the speech support service server 302 may conduct dialogs with a user of the portable music device 102 to determine the intent of a user. Generally, a speech dialog comprises a sequence of speech questions, answers, and/or statements pertaining to a particular action or intent of the user. More specifically, a speech dialog may comprise a series of speech expressions that may include utterances by the user and speech messages generated by the speech support service server 302. A speech dialog, for example, may begin upon an initial user utterance. The speech support service server 302 may respond with a speech message, such as "what do you want to do?" The user may respond by making a statement in answer to the question. This process may iterate until the speech support service server 302 is able to determine a specific action to take or function to invoke. In the implementation of FIG. 3, the speech expressions are conveyed as audio signals between the portable music device 102 and the speech support service server 302.

In embodiments described herein, the portable music device 102 is designed to play music in response to commands spoken by a user. For example, the user might press the talk button 110 and state "Play music by the Beatles." The user utterance is provided as an audio stream 306 to the speech support service server 302, which performs speech recognition and natural language understanding to determine the meaning of the user utterance. In response to the user utterance, the speech support service server 302 instructs the portable music device 102 to play music by the Beatles. In some cases, as mentioned above, the speech support service server 302 may conduct a two-directional speech dialog with the user to further refine the intent of the user, such as to determine a specific track that the user wants to hear. Upon fully defining the user intent, the speech support service server 302 instructs the portable music device 102 to play the desired track. In response to being instructed to play a particular audio selection, the portable music device 102 obtains the audio selection from a designated source, which may include network-accessible music services, local media storage, local music peripherals, etc. Alternatively, the speech support service server 302 may provide the audio selection as an audio stream to the portable music device 102.

In certain embodiments, the portable music device 102 may be configured to activate and utilize its own speech services 316 rather than the speech services of the speech support service server 302. In particular, the portable music device 102 may be configured to detect situations in which it is receiving external electrical power and may utilize one or more of its local speech services 316 in these situations.

In one example, the local speech services 316 may include a wakeword detection component 344. The wakeword detection component 344 may comprise a keyword detector that is configured to continuously monitor and audio signal from the microphone 106 to detect user utterances of a preselected keyword or wakeword, which is more generally referred to herein as a trigger expression. The trigger expression may comprise a keyword, a wakeword, an expression, a phrase, or some other sound or utterance that has been designated as indicating an intent by the user to direct speech to the portable music device 102.

The wakeword detection component 344 may be implemented using keyword spotting technology. A keyword spotter is a functional component or algorithm that evaluates an audio signal to detect the presence a predefined word or expression in the audio signal. Generally, a keyword spotter uses simplified ASR techniques to detect a specific word or a limited number of words rather than attempting to recognize a large vocabulary. For example, a keyword spotter may provide a notification when a specified word is detected in an audio signal, rather than providing a textual or word-based output. A keyword spotter using these techniques may compare different words based on hidden Markov models (HMMs), which represent words as series of states. Generally, an utterance is analyzed by comparing its model to a keyword model and to a background model. Comparing the model of the utterance with the keyword model yields a score that represents the likelihood that the utterance corresponds to the keyword. Comparing the model of the utterance with the background model yields a score that represents the likelihood that the utterance corresponds to a generic word other than the keyword. The two scores can be compared to determine whether the keyword was uttered.

In certain embodiments, audio may be streamed to the speech support service server 302 in response to either the talk button 110 being activated or in response to detection of the wakeword. In response to receiving the audio, the speech support service server 302 performs ASR and NLU to determine the meaning of the user speech and to determine an appropriate response.

In some embodiments, local wakeword detection may be used only when the portable music device 102 is connected to and receiving external power, such as when the portable music device 102 is placed in its charging dock 202. When using wakeword detection, audio that is subsequent in time to the utterance of the wakeword is provided to the speech support service server 302. During times in which the portable music device 102 is operating from its internal rechargeable battery, without connection to external power, wakeword detection is disabled and audio is provided to the speech support service server only during times when the talk button 110 is pressed. Disabling the wakeword detection when operating from battery power reduces the computational load of the processor 310 and thereby reduces power consumption of the portable music device 102.

In some embodiments, the speech services 316 may also include ASR functionality 346. In some embodiments, the speech services 316 may also include NLU functionality 348. When these functionalities are present, they may be used in place of the corresponding functionalities provided by the speech support service server 302 during times when the portable music device 102 is receiving external power. Thus, rather than sending the audio signal 306 to the speech support service server 302, the portable music device 102 may perform ASR and/or NLU internally and may respond to user speech based on the internal or local analysis of captured audio. During times when the portable music device 102 is not connected to external power, audio may be sent to the speech support service server 302 for speech analysis, thereby reducing power consumption of the portable music device 102. The local ASR functionality 346 and NLU functionality 348 may use techniques similar to those used by the ASR service 334 and the NLU service 336 of the speech support service server 302.

In addition to wakeword detection, ASR, and NLU, the portable music device may have other capabilities that are enabled only during those times when the portable music device 102 is receiving external power. Limiting usage of these capabilities to these times allows the portable music device 102 to conserve power and to prolong battery life.

Figure 4:
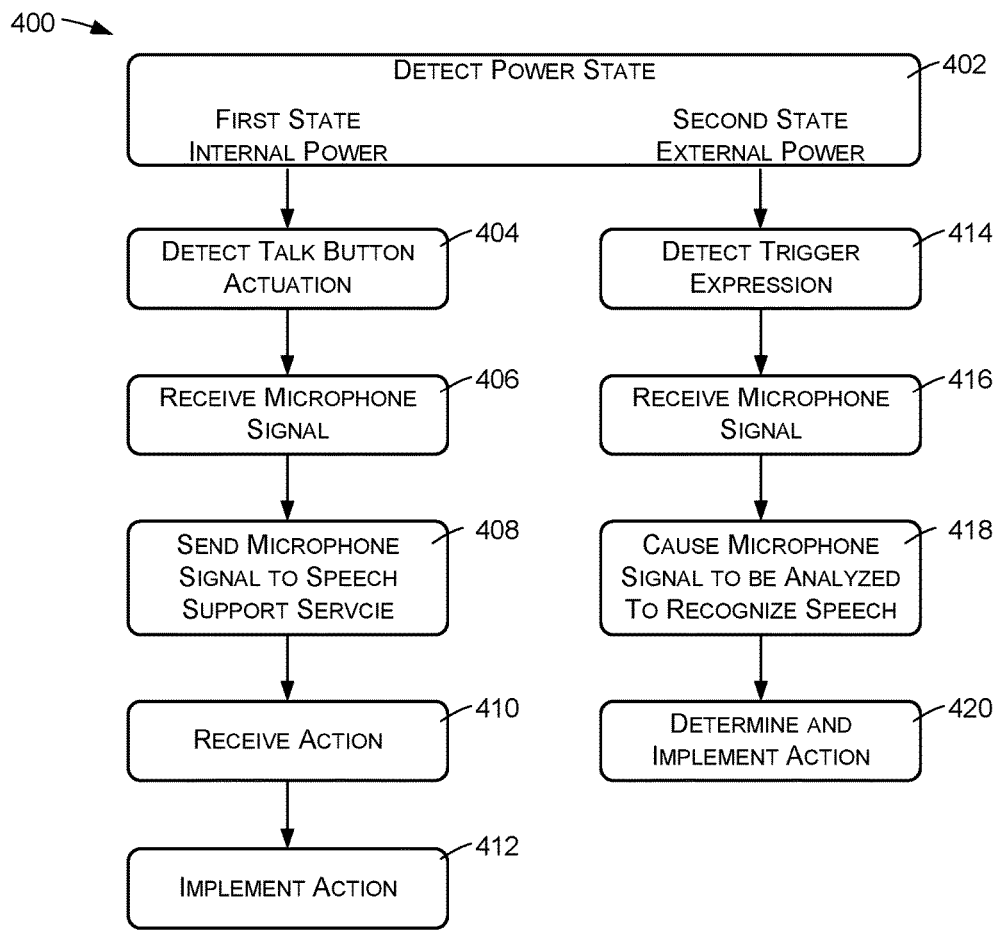
FIG. 4 is a flow diagram illustrating different modes of operating the example portable music device.

FIG. 4 shows an example method 400 that may be implemented by the portable music device 102 to interact with a user for playing audio content or performing other activities in response to spoken user commands. An action 402 detecting which of multiple power states the music device 502 is in. In the described implementation, there are two possible power states. The first power state comprises the state in which the music device 102 is operating solely from internal battery power and is not receiving external electrical power. The second power state comprises the state in which the music device 102 is receiving electrical power from a source external to the music device 102, other than the internal battery of the music device 102. Accordingly, the action 402, which may be performed by the power detector 322, comprises detecting whether the music device 102 is in the first power state or the second power state. Detecting that the music device 102 is in the first power state comprises determining that power is not being received from an external power source. Detecting that the music device 102 is in the second power state comprises determining that power is being received from an external power source.

In other embodiments, the power states may correspond to different conditions. For example, the first power state may correspond to a condition in which the internal battery of the music device 102 has a charge level that is below a selected threshold. For example, the first power state may correspond to the battery having a charge level below 10%. The second power state may correspond to a condition in which the internal battery of the music device 102 has a charge level that is above the selected threshold. For example, the second power state may correspond to the battery having a charge level above 10%.

The music device 102 operates in a first user interaction mode in response to detecting that the music device 102 is operating in the first power state. The music device 102 operates in a second user interaction mode in response to detecting that the music device 102 is in the second power state. A path along the left side of FIG. 4 is followed to implement the first user interaction mode. A path along the right side of FIG. 4 is followed to implement the second user interaction mode.

Operating in the first user interaction mode comprises the actions shown on the left side of FIG. 4. An action 404 comprises detecting actuation of the talk button 110. In response to actuation of the talk button 110, an action 406 is performed of receiving first speech input and generating first microphone audio data corresponding to the first speech input, using the microphone 106 of the music device 102. In operation, the user will speak while pressing the talk button, and the first microphone audio signal will therefore contain first user speech input that corresponds to a spoken user command. In some cases, the command may specify music that is to be played by the music device 102.

An action 408 comprises sending the first microphone audio data to the speech support service server 302 for analysis, which may include ASR and NLU. For example, the speech support service server 302 may perform ASR and NLU to identify a song that the user has requested to be played by the music device 102. The first microphone audio data may be sent as a digital audio stream over the wide-area network 304 using the WiFi interface 326 of the music device.

An action 410 comprises receiving an indication from the speech support service server 302 of an action to be performed in response to the spoken user command. In some cases, the action 410 may comprise or may include receiving audio data corresponding to or representing the song that the user has requested to be played by the music device 102. For example, the music device 102 may communicate over the wide-area network 304 with a music service using the WiFi interface 326 to receive an audio signal from the music service, where the audio signal contains the song.

An action 412 comprises implementing the action indicated by the speech support service, such as by playing the song that has been identified based on the spoken user command. The song may be played using the speakers 108 of the music device 102.

Operating in the second user interaction mode comprises the actions shown on the right side of FIG. 4. An action 414 comprises detecting a user utterance of a trigger expression. For example, the music device may receive second speech input and may generate audio data representing or corresponding to the second user speech input. The wakeword detection component 344 may monitor the audio data to detect the user utterance of the trigger expression.

In response to detection of the user utterance of the trigger expression, an action 416 is performed of receiving third speech input and may generate audio data representing or corresponding to the third speech input. In use, the user will continue to speak after uttering the trigger expression, and the third audio data will therefore contain user speech input that corresponds to a second spoken user command. In some cases, the second command may specify another song that is to be played by the music device 102.

An action 418 may comprise causing the third audio data to be analyzed to recognize the third user speech and to determine a meaning or intent of the third user speech. In some cases, this may include identifying the song that the user has requested to be played.

In some implementations, causing the third audio data to be analyzed may comprise sending the third audio data to the speech support service server 302 over the wide-area network 304 using the WiFi interface 326 for analysis of the third audio data by the speech support service server 302. In other cases, causing the third audio data to be analyzed may comprise recognizing the user command using speech recognition and/or natural language understanding capabilities of the music device 102 itself.

An action 420 may comprise determining and implementing an action in response to the second user command. In some cases, the action 418 may comprise playing music or a song specified by the second user command. In some cases, the action 418 may comprise receiving audio data from a music service, where the audio data contains the music or song specified by the user command, and may additionally comprise rendering the audio signal to play the music.

Figure 5:
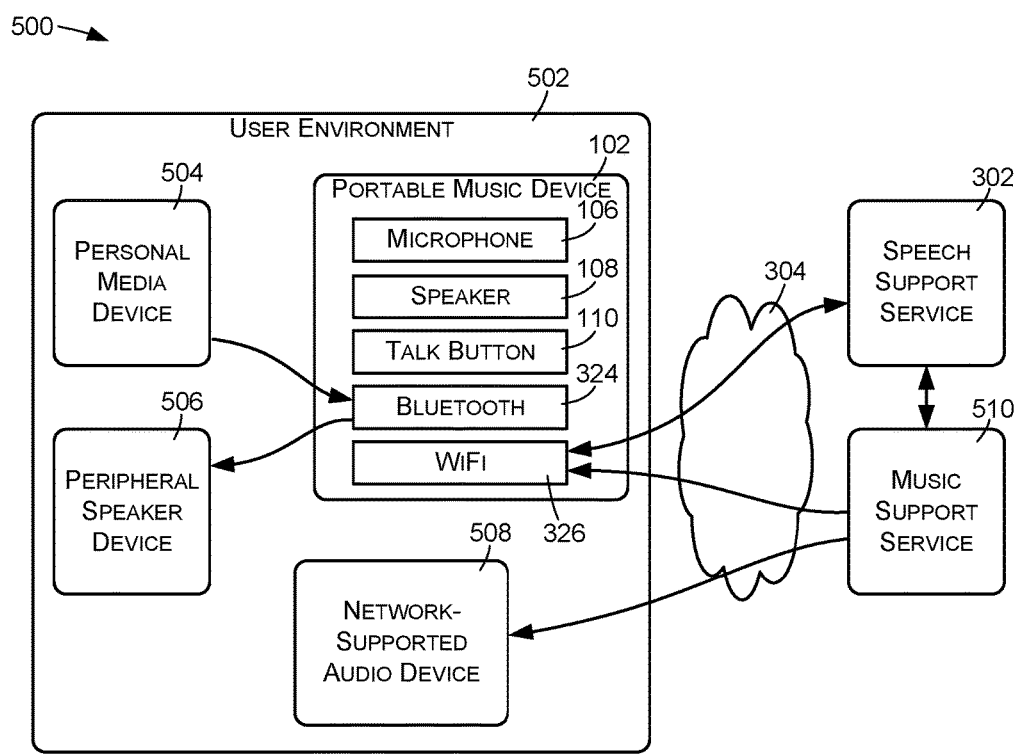
FIG. 5 is a block diagram showing the example portable music device being used in conjunction with network-accessible support services and other devices.

FIG. 5 shows an example system 500 in which the portable music device 102 may operate. In this example, the portable music device 102 is located within a user environment 502, which comprises the physical environment of a user of the device 102. The environment 502 may comprise, for example, a house, a building, a room, an automobile, an area, etc. The user environment 502 may include local devices and systems that are within physical proximity of the user. Such devices and systems may include audio and/or speaker devices that are audible from the location of the portable music device 102.

Devices within the environment 502 may include a local, personal media device 504 such as a smartphone, a tablet computer, a personal media player, a computer, or some other device that stores music and/or other audio content that belongs to or is accessible by the user of the personal media device 504. For example, the personal media device 504 may store audio content for playback through Bluetooth peripherals and/or through headphones. In some cases, the personal media device 504 may be of a type that streams audio content from a remote source or service such as a subscription-based or pay-per-use streaming music service. The personal media device 504 may have network communications capabilities in order to communicate with music or content services and to obtain content from such services. In some cases, the personal media device 504 may have a radio-frequency (RF) tuner in order to receive terrestrial, over-the-air broadcasts. The personal media device 504 may in some cases receive content from other sources such as cable broadcast systems.

Local devices and systems may also include a local peripheral speaker device 506 that has or is associated with its own speaker for playing music within the user environment 502. As an example, the peripheral speaker device 506 may comprise the audio system of an automobile. As other examples, the peripheral speaker device 506 may comprise a Bluetooth® speaker or a home stereo system.

Local devices and systems may also include a network-supported audio device 508 that has or is associated with a speaker for playing music or other audio within the user environment 502. The network-supported audio device 508 may comprise, for example, a device that streams and plays music from an online and network-accessible music service such as a subscription content service or an on-demand music service. The network-supported audio device 508 may have an associated graphical user interface or a speech-based interface. In some cases, the network-supported audio device 508 may be controlled from an application that runs on a device other than the network-supported audio device 508 itself, such as on a networked computer, a smartphone, a tablet computer, a dedicated wireless controller, or some other device. In other cases, the network-supported audio device 508 may be controlled and configured by a network-accessible support service and/or a network-accessible music service.

Certain functionality of the portable music device 102 may be provided or supported by network-accessible servers or services. As examples, such services may include the speech support service server 302. Additionally, such services may include a music support service 510.

The music support service 510 may be one of multiple music services that are accessible by the music device 102 and from which the music device 102 may obtain music or other audio content. The music support service 510 may comprise an online service or source that stores and provides music on a per-song and/or subscription basis. The music support service 510 may comprise a music streaming service that provides streaming audio to the speaker device 102 as the music is being played. In some embodiments, the music support service 510 may be configurable by the speech support service server 302 on behalf of the user and/or on behalf of the portable music device 102.

In some cases, the network-supported audio device 508 may be associated with a support service such as the music support service 510 and the music support service 510 may provide content to the network-supported audio device 508. The speech support service server 302 may be capable of configuring or controlling the network-supported audio device 508 through the music support service 510.

The music support service 510 may be implemented as a network-based or cloud-based service. Communications between the portable music device 102 and the services 302 and 510 may be implemented through the wide-area network 304.

The support services 302 and 510 may be part of one or more network-accessible computing platforms that are maintained and accessible via the Internet. Network-accessible computing platforms such as this may be referred to using terms such as "on-demand computing", "software as a service (SaaS)", "platform computing", "network-accessible platform", "cloud services", "data centers", and so forth. The support services 302 and 510 may serve large numbers of portable music devices 102 and other devices, which may be located in the premises of many different users.

The portable music device 102, the speech support service server 302, and the music support service 510 may be configured to interact according to a web services model. The speech support service server 302 and the music support service 510 may be implemented as one or more web services. Generally, a web service may comprise any type of computing service that is made available to a requesting client via a request interface that includes one or more Internet-based application layer data transport protocols, such as a version of the Hypertext Transport Protocol (HTTP) or another suitable protocol.

The Bluetooth interface 324 of the portable music device 102 may be used by the portable music device 102 to communicate with the personal media device 504 and/or to communicate with the peripheral speaker device 506. More specifically, the portable music device 102 may receive music or other audio content from the personal media device 504 using the Bluetooth interface 324. Similarly, the portable music device 102 may provide music or other audio content to the peripheral speaker device 506 using the Bluetooth interface 324. The Bluetooth interface 324 may also be used to communicate commands, status, and other information between the portable music device 102 and each of the personal media device 504 and peripheral speaker device 506.

In what is referred to as a peripheral mode of operation, the portable music device 102 passively receives and plays an audio stream or audio signal from the personal media device 504. The audio stream may be received using the Bluetooth communications interface 324 and an associated device-to-device Bluetooth communications channel. The audio stream may be played on the speakers 108 of the portable music device 102.

In what is referred to as a voice control mode of operation, the portable music device 102 identifies and plays music or other audio content in response to spoken user commands. In this mode, the portable music device 102 captures a vocal utterance of a user. The vocal utterance may be captured using the microphone 106 and provided to the speech support service server 302 in response to the user pressing or actuating the talk button 110. Alternatively, the vocal utterance may be captured and provided in response to utterance of a wakeword. The vocal utterance, which may contain or correspond to a spoken command for the music device 102 to play specified music, may be provided to the speech support service server 302 as an audio stream or audio signal. The speech support service server 302 analyzes the audio stream to identify the content specified by the user. Depending on circumstances and/or configuration, the portable music device 102 may play the identified music track on its own speakers 108 or may play the music track on peripheral audio systems within the environment 502 such as on the peripheral speaker device 506 or the network-supported audio device 508.

The portable music device 102 may receive the identified music from the music support service 510 in response to identifying the music. For example, the speech support service server 302 may communicate with the music support service 510 and may instruct the music support service 510 to provide the identified music to the portable music device 102. Alternatively, the speech support service server 302 may identify the music to the portable music device 102 and the portable music device 102 may request the identified music from the music support service 510. The music may be received as an audio stream from the music support service 510 using the WiFi communications interface 326.

In some embodiments, the portable music device 102 may be configured to determine whether the portable music device 102 is in the vicinity of available peripheral audio systems or devices and to play the music specified by the user on available devices that are nearby. If no such audio devices are currently available within the physical proximity of the portable music device 102, the portable music device 102 may play the music on its own speakers 108. The presence, proximity, and/or availability of peripheral audio devices may be ascertained by attempting to communicate with the audio devices using Bluetooth or other limited-range communications technologies.

Alternatively, or in addition, the portable music device 102 may be configured to determine its position using GPS or with reference to the names of available WiFi networks. The portable music device 102 may be configured by a user to utilize certain peripheral audio devices when in certain locations.

When using a peripheral device to play the music, the portable music device 102 may provide the audio stream received from the music support service 510 to the peripheral device using the Bluetooth communications interface 324. When using a network-supported audio device such as the device 508 to play the music, the portable music device 102 may direct the music support service 510 to provide the music directly to the network-supported audio device 508.

Figure 6:
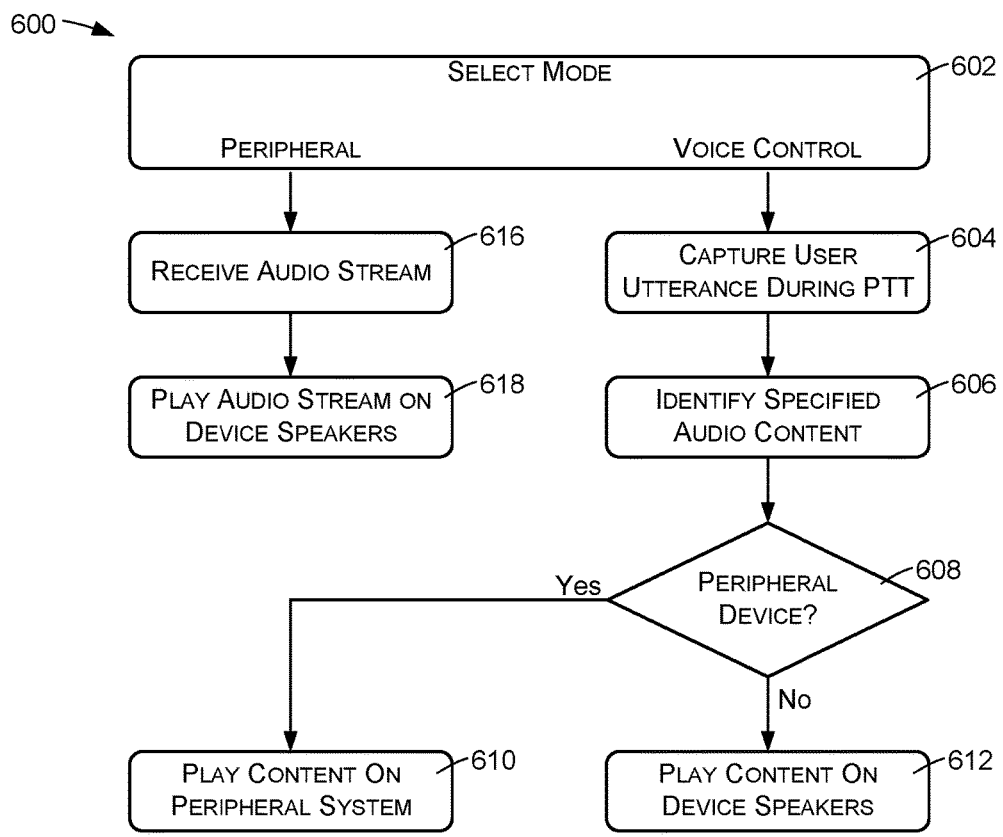
FIG. 6 is a flow diagram illustrating different modes of operating the portable music device.

FIG. 6 illustrates an example method 600 that may be implemented by the portable music device 102 to play music or other audio content. An action 602 comprises selecting one of multiple operational modes. As described above, the operational modes may include a voice control mode and a peripheral mode. In certain embodiments, the portable music device 102 may be configured to operate in the voice control mode during times in which wide-area network communications are available with the one or more support services 301 and 510. The portable music device 102 may be configured to operate in the peripheral operational mode during times in which a personal device of the user, such as the personal media device 504, is available for communications using a device-to-device communications channel such as a Bluetooth communications channel.

A path along the right side of FIG. 6 is followed when operating in the voice control mode. An action 604 comprises capturing a user utterance that contains a spoken user command to play specified music or other audio content. The action 604 may comprise detecting that the talk button 110 is actuated and generating or receiving user audio using the microphone 106 while the talk button is actuated.

An action 606 comprises identifying the music or other audio content that is specified by the spoken user command. The action 606 may comprise providing the user audio to the speech support service server 302 for analysis of the user audio. The speech support service server 302 implement ASR to recognize speech that is present in the user audio. The speech support service server 302 may also implement NLU to determine the meaning of the recognized speech and to identify the audio content that is specified by the speech. In some implementations, the speech support service server 302 may conduct a two-directional speech dialog with the user to determine the intent of the user and/or to unambiguously identify the music that user wants to play.

Each user utterance may be captured by the microphone 106 of the portable music device 102 and provided to the speech support service server 302 as an audio stream that contains the user utterance. The user may press the talk button 110 to indicate that he or she is speaking to the speech support service server 302. The responsive speech generated by the speech support service server 302 may be provided as an audio stream to the portable music device 102 and rendered on the speakers 108 of the portable music device 102.

An action 608 comprises determining whether there is a peripheral audio device that is currently configured and available to receive and play audio content in the user environment 502. In some embodiments, the action 608 may comprise determining whether the music device 102 is at a location where there is a peripheral device capable of playing audio provided by the music device 102. Examples of peripheral audio devices are shown in FIG. 5 as the peripheral speaker device 506 and the network-supported audio device 508. If there is a peripheral audio device that is at the current location of the music device 102 and that is available to receive and play audio content, an action 610 is performed of playing the requested audio content on the peripheral audio device. If there is not a peripheral audio device at the current location of the music device 102 that is configured and available to receive and play audio content, an action 612 is performed of playing the requested audio content on the speakers 108 of the portable music device 102.

The action 612 of playing the audio content on the speakers 108 may include receiving the audio content from a network-based service such as the music support service 510. The action 612 may comprise streaming the audio content over a wide-area communications network such as the Internet using the WiFi communications interface 326. The term "streaming" indicates that the audio content is played as it is being received.

The action 610 may similarly include receiving and/or streaming the audio content from a network-based service. However, the action 610 may further comprise providing or streaming the audio content to a peripheral audio device such as the peripheral speaker device 506.

Alternatively, the action 610 may comprise configuring a network-supported audio device such as the device 508 to play the audio content by receiving and/or streaming the audio content from the music support service 510 or another music service. The portable music device 102 may accomplish this by requesting the music support service 510 to play the audio content on the network-supported audio device 508. Alternatively, the speech support service server 302 may instruct the music support service 510 to play the audio content on the network-supported audio device 508.

Figure 7:
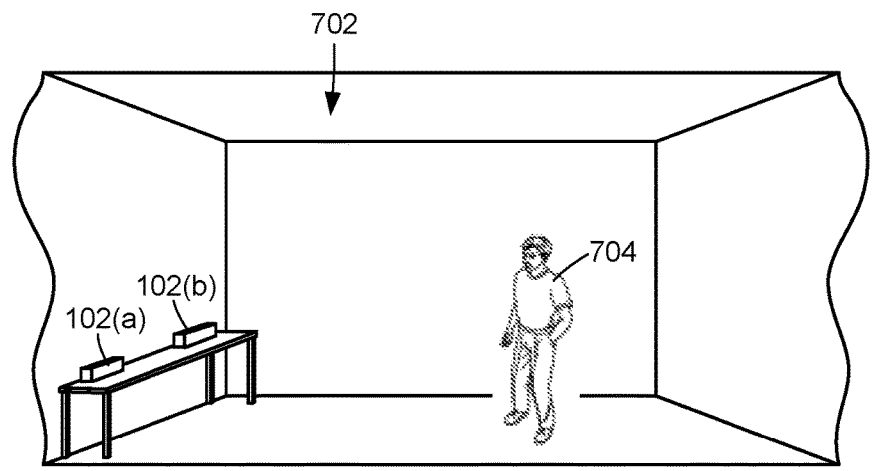
FIG. 7 is a front view of an environment in which multiple portable music devices may be used.

FIG. 7 shows an example of using multiple portable music devices 102 within a room 702. In this example, two multiple portable music devices 102(a) and 102(b) are positioned at different locations in the room 702 to play different channels of a multi-channel audio signal. A user 704 may interact with the music devices 102 using speech as described above. In this example, it is assumed that the portable music devices 102 are connected to and receiving external power, so that the user 704 may direct speech to the music devices 102 using a wakeword rather than pressing the talk buttons of the devices.

A multi-channel audio signal may comprise a stereo audio signal, for example, which has a left-side audio channel and a right-side audio channel. In the illustrated example, the music device 102(a) receives and plays the left-side audio channel and the music device 102(b) receives and plays the right-side audio channel.

Although FIG. 7 shows two music devices 102(a) and 102(b), any number of speaker devices may be used in conjunction with each other to play different channels of a multi-channel audio signal. For example, a music device may be used for each channel of a surround sound audio signal, also referred to as a 5.1 audio signal. A 5.1 surround sound audio signal contains five full bandwidth audio channels, each of which may be directed to a respective music device 102.

Figure 8:
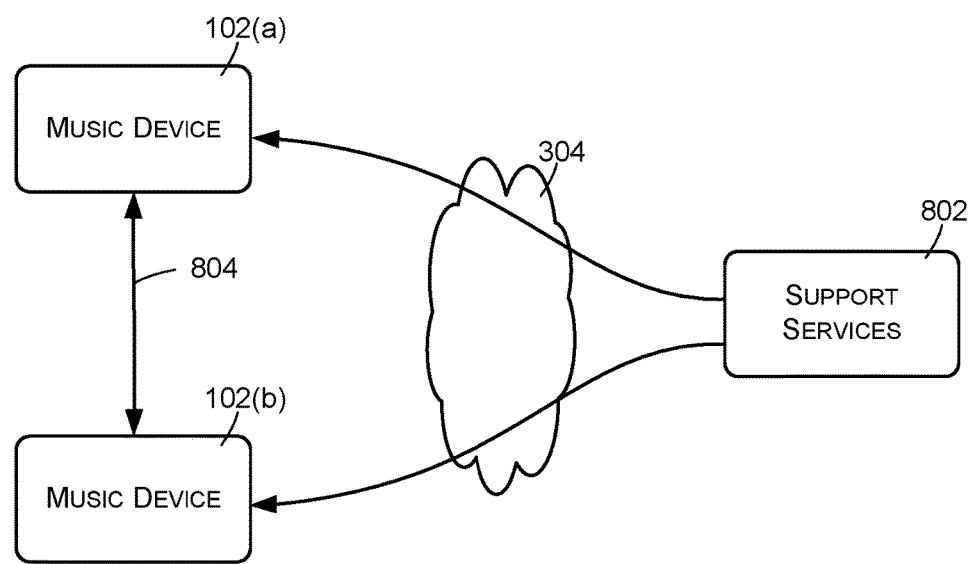
FIG. 8 is a block diagram illustrating communications between the portable music devices of FIG. 7 and network-accessible support services.

FIG. 8 illustrates a communication architecture that may be used in conjunction with the configuration shown in FIG. 7. Each of the multiple music devices 102 may be configured to communicate independently with support services 802, which may include the speech support service server 302 and/or the music support service 510. Each of the music devices 102 is configured to receive an independent audio stream of a multi-channel audio stream. More specifically, each of the portable music devices 102 is configured to use its Wi-Fi interface 326 to communicate with the support services 802 over the wide-area network 304 and to receive a respective audio channel from the support services 802.

The music devices 102 may also communicate with each other using a local peer-to-peer WiFi connection 804 to synchronize playback of the received audio streams. For example, the portable music devices may communicate with each other periodically to synchronize internal clocks so that the multiple music audio streams can be played in synchronization. The music devices 102 may also communicate with each other to coordinate reception and analysis of user speech.

The user 704 may configure the respective portable music devices 102 by speech. For example, the user 704 may press the talk button of the portable music device 102(a) and say "This is the left-side speaker." The user 704 may press the talk button of the portable music device 102(b) and say "This is the right-side speaker." This information is conveyed to the support services 802 as configuration information so that the support services 802 can provide the correct audio stream to each device 102. Alternatively, the support services 802 may initiate a speech dialog with the user 704 to configure the portable music devices 102. For example, the user 704 may be asked during a speech dialog to press the talk button of the left-side music device to identify that device. The user 704 may then be asked to press the talk button of the right-side music device to identify that device.

Figure 9:
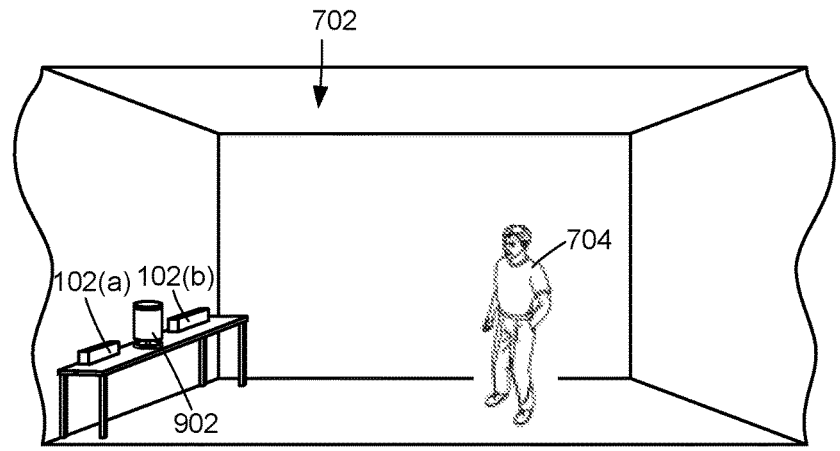
FIG. 9 is a front view of an environment in which multiple portable music devices may be used in conjunction with a base audio device.

FIG. 9 shows an example of using multiple portable music devices 102 in conjunction with a base audio device 902. The base audio device 902 may be a device that is similar in functionality to each of the portable music devices 102 except for having a more robust audio input system and possibly enabling services other than music. For example, the base audio device 902 may respond to a larger vocabulary and provide a wider range of services. Services may include requesting news or weather information, ordering goods and services, providing various types of information, sending messages, controlling home devices, and so forth.

In addition, the base audio device 902 may have a microphone array for use in conjunction with beamforming techniques to produce multiple directional audio signals, each of which emphasizes sound from a different direction relative to the base audio device 902. The use of directional audio signals allows the device to focus on the position of the user and to reduce non-voice noise in audio signals that are subject to ASR and NLU. The base audio device 902 is designed for stationary placement within a room and may in many embodiments be powered from an external source rather than from an internal battery.

Figure 10:
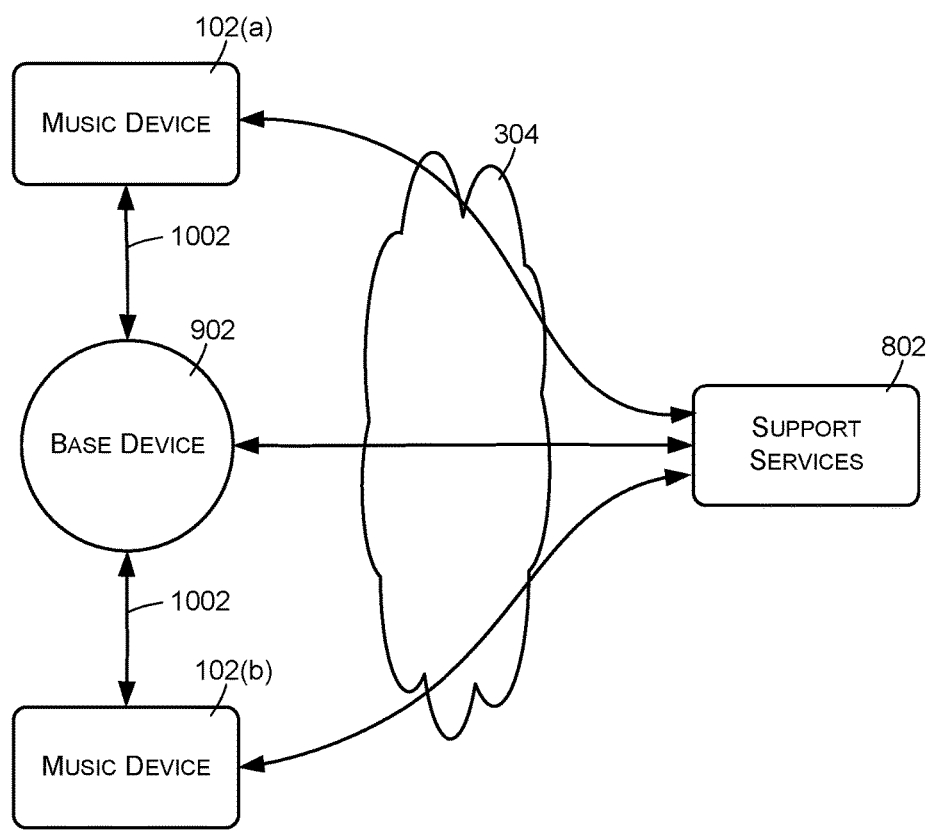
FIG. 10 is a block diagram illustrating communications between the devices of FIG. 9 and network-accessible support services.

FIG. 10 shows an example communications architecture that may be used by the base audio device 902 in conjunction with the configuration shown in FIG. 9. The base audio device 902 and each of the multiple portable music devices 102 may be configured to communicate independently with the support services 802, which may include the speech support service server 302 and/or the music support service 510. The base audio device 902 and each of the multiple portable music devices 102 may be configured to receive independent audio streams of a multi-channel audio stream. For example, the portable music device 102(a) may receive a left-side audio channel, the portable music device 102(b)

may receive a right-side audio channel, and the base audio device 902 may receive a center audio channel More specifically, the base audio device and each of the portable music devices 102 may be configured to use WiFi interfaces to communicate with the support services 802 over the wide-area network 304 and to receive a respective audio channel from the support services 802.

The base audio device 902 and each of the multiple portable music devices 102 may also communicate with each other using local peer-to-peer WiFi connections 1002 to synchronize playback of the received audio streams. For example, the portable music devices may communicate with each other periodically to synchronize internal clocks so that the multiple music audio streams can be played in synchronization. In the configuration illustrated by FIGS. 9 and 10, speech interactions with the user 704 may be primarily the responsibility of the base speaker device 902.

In certain embodiments, the base audio device 902 and the music devices 102 may be configured to exchange information regarding relative positions or may be configured to exchange signals and/or other information allowing the base audio device 902 to determine the relative positions of the devices. For example, the music device 102(*a*) may communicate with the base device 902 to signal its presence and may also produce an audio tone or other sound using its speaker 108. The tone may have a calibrated energy or loudness. The base audio device 902 captures the tone and determines the position of the music device 102(*a*) relative to the base audio device 902 by analyzing a microphone signal containing the tone.

The direction of the music device 102(*a*) relative to the base audio device 902 may be determined by evaluating the energy presence of the tone in each of the directional audio signals produced by the base audio device 902. The direction corresponding to the identified directional audio signal in which the tone is loudest corresponds to the direction of the music device 102(*a*).

The distance of the music device from the base audio device 902 may be determined by evaluating the energy level of the tone within the identified directional audio signal. A higher energy level indicates that the music device 102(*a*) is relatively closer to the base audio device 902. A lower energy level indicates that the music device 102(*a*) is relatively farther from the base audio device 902.

The base audio device 902 may interact with each of the music devices 102 in this manner to determine the relative positions of all music devices 102 that are in the vicinity of the base audio device 902 and may configure audio output in accordance with the relative positions of the devices. For example, the base audio device 902 and/or the support services 802 may assign different audio channels to different music devices 102 based on their relative locations.

A device such as the base audio device 902, which has microphones suitable for beamforming, may also be configured to perform sound source localization (SSL) based on relative times of arrival of the tones issued by the music devices. SSL uses techniques similar to beamforming to determine positions of sound sources in one, two, or three dimensions. SSL can be implemented so that it is not dependent upon the energy at which the sound source emits sound.

In certain embodiments, the base audio device 902 may be configured to listen for user speech from certain directions, depending on the determined locations of the music devices 102. Specifically, the base audio device 902 may be configured to ignore or disable directional audio signals corresponding to the directions of the music devices 102, and to attempt to detect voice or speech only in the directional audio signals corresponding to directions other than the directions of the music devices 102.

Figure 11:
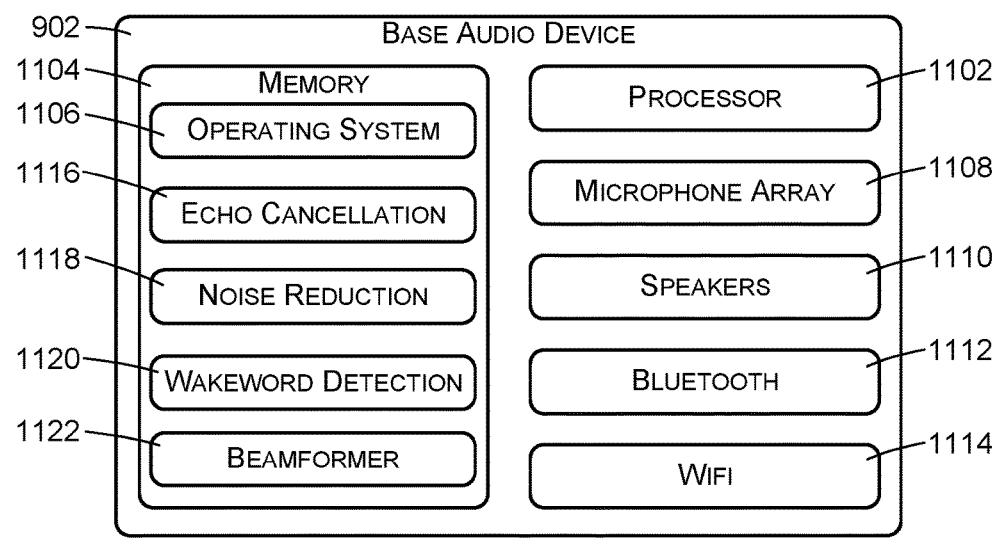
FIG. 11 is a block diagram illustrating relevant components of a base audio device that may be used in conjunction with the portable music device.

FIG. 11 illustrates an example implementation of the base audio device 902. The base audio device 902 has operational logic, which in the illustrated example comprises a processor 1102 and memory 1104. The processor 1102 may include multiple processors and/or a processor having multiple cores. The processor 1102 may comprise processor extensions, co-processors, digital signal processors, and so forth.

The memory 1104 may contain applications and programs in the form of computer-executable instructions that are executed by the processor 1102 to perform acts or actions that implement desired functionality of the base audio device 902, including the functionality described herein. The memory 1104 may be a type of computer storage media and may include volatile and nonvolatile memory. Thus, the memory 1104 may include, but is not limited to, RAM, ROM, EEPROM, flash memory, or other memory technology.

FIG. 11 shows examples of applications and/or programs that may be provided by the base audio device 902 and stored by the memory 1104 to implement functionality of the base audio device 902, although many other applications and types of functionality may be provided in various embodiments.

The base audio device 902 may have an operating system 1106 that is configured to manage hardware and services within and coupled to the base audio device 902 and to implement the general functionality of the base audio device 902 as described herein.

The base audio device 902 has a microphone array 1108 and one or more speakers 1110. The microphone array 1108 has multiple microphone elements that are spaced from each other so that they can be used for audio beamforming. The microphone array 1108 produces multiple microphone audio signals corresponding respectively to the microphone elements of the microphone array.

The base audio device 902 may have a device-to-device wireless communications interface, which in the illustrated embodiment comprises a Bluetooth® personal-area-networking (PAN) interface 1112. The base audio device 902 may also have a wireless wide-area network (WAN) communications interface such as a WiFi® interface 1114. The WiFi interface 1114 may be configured to communicate over the wide-area network 304 with the support services 802. More generally, the base audio device 902 may communicatively couple to the wide-area network 304 via wired technologies (e.g., wires, universal serial bus (USB), fiber optic cable, etc.), wireless technologies (e.g., radio frequencies (RF), cellular, mobile telephone networks, satellite, Bluetooth®, Wi-Fi, etc.), or other connection technologies.

Software components stored within the memory 1104 may include an acoustic echo cancellation or suppression component 1116 for reducing acoustic echo generated by acoustic coupling between the microphone array 1108 and the speaker 1110. Software components may also include a noise reduction component 1118 for reducing noise in received audio signals, such as elements of microphone audio signals other than user speech.

Components of the base audio device 902 may further comprise one or more audio beamformers or beamforming components 1120 that are configured to generate directional audio signals that are focused in different directions. More specifically, the beamforming components 1120 may be responsive to spatially separated microphone elements of the microphone array 1108 to produce audio signals that emphasize sounds originating from different areas of the room 702 or from different directions relative to the base audio device 902.

Audio beamforming, also referred to as audio array processing, uses multiple omnidirectional microphone elements that are spaced from each other at known distances. Sound originating from a sound source is received by each of the microphone elements. However, because each microphone element is at a different distance from the sound source, a propagating sound wave arrives at the microphone elements at slightly different times. The difference in arrival time results in phase differences between audio signals produced by the microphone elements. The phase differences can be exploited to enhance or amplify sounds originating from chosen directions relative to the microphone array.

More specifically, beamforming uses signal processing techniques to combine signals from the different microphone elements so that sounds originating from a particular direction are emphasized or amplified while sounds originating from other directions are deemphasized or attenuated. In particular, signals from the different microphones are combined in such a way that sounds from a particular direction experience constructive interference, while sounds from other directions experience destructive interference. The parameters used in beamforming may be varied to dynamically select different directions, even when using a fixed-configuration microphone array.

In certain implementations, a potentially different delay is added to each microphone signal so that sounds from a particular direction become aligned in time. These delayed signals are then summed. A beamformer such as this is referred to as having a delay-sum architecture. The amount of delay for each microphone signal is determined based on the known spatial relationships of the microphones and the direction from which sounds are to be emphasized. The delays can be changed over time to receive sounds from different directions.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. A first electronic device, comprising:
   at least one microphone;
   at least one speaker;
   one or more processors; and
   one or more computer-readable media storing instructions that, when executed by the one or more processors, cause the one or more processors to perform operations comprising:
   causing the first electronic device to operate in a first mode;
   generating, while the first electronic device is operating in the first mode, first audio data representing user speech captured by the at least one microphone;
   causing the first audio data to be analyzed;
   determining that the first electronic device is communicatively coupled to a second electronic device;
   causing, based at least in part on determining that the first electronic device is communicatively coupled to the second electronic device, the first electronic device to switch from operating in the first mode to operating in a second mode;
   receiving, while the first electronic device is operating in the second mode, second audio data from the second electronic device; and
   outputting, using the at least one speaker, audible content represented by the second audio data.

2. The first electronic device of claim 1, the operations further comprising:
   determining that the first electronic device is communicatively coupled to one or more remote computing devices,
   wherein causing the first electronic device to operate in the first mode is based at least in part on determining that the first electronic device is communicatively coupled to the one or more remote computing devices.

3. The first electronic device of claim 1, the operations further comprising:
   determining that the first electronic device is not communicatively coupled to one or more remote computing devices,
   wherein causing the first electronic device to switch from operating in the first mode operating in the second mode is further based at least in part on determining that the first electronic device is not communicatively coupled to the one or more remote computing devices.

4. The first electronic device of claim 1, wherein causing the first audio data to be analyzed comprises sending the first audio data to one or more remote computing devices, and wherein the operations further comprise:
   receiving third audio data from the one or more remote computing devices, wherein the third audio data is based at least in part on the first audio data; and
   outputting, using the at least one speaker, additional audible content represented by the third audio data.

5. The first electronic device of claim 1, wherein causing the first audio data to be analyzed comprises:
   analyzing the first audio data to identify one or more words within the user speech; and
   identifying third audio data based at least in part on analyzing the first audio data,
   and wherein the operations further comprise outputting, using the at least one speaker, additional audible content represented by the third audio data.

6. The first electronic device of claim 1, the operations further comprising:
   identifying third audio data based at least in part on causing the first audio data to be analyzed; and
   sending the third audio data to the second electronic device.

7. The first electronic device of claim 1, the operations further comprising:
   determining that the first electronic device is not communicatively coupled to the second electronic device,
   wherein causing the first electronic device to operate in the first mode is based at least in part on determining that the first electronic device is not communicatively coupled to the second electronic device.

8. The first electronic device of claim 1, wherein:
   the first mode includes a voice-controlled mode where the first electronic device communicates with one or more remote computing devices configured to analyze generated audio data; and
   the second mode includes a peripheral mode where the first electronic device communicates with the additional electronic device.

9. A method comprising:
   determining that a first electronic device is operating in a first mode;

while the first electronic device is operating in the first mode:
  generating first audio data representing sound captured by at least one microphone of the first electronic device;
  sending the first audio data to one or more remote computing devices; and
  receiving, from the one or more remote computing devices, at least one of second audio data or information for acquiring the second audio data;
determining that the first electronic device is operating in a second mode;
receiving, while the first electronic device operating in the second mode, third audio data from a second electronic device; and
outputting audible content represented by the third audio data.

10. The method of claim 9, further comprising:
determining that the first electronic device is communicatively coupled to the one or more remote computing devices; and
operating the first electronic device in the first mode based at least in part on determining that the first electronic device is communicatively coupled to the one or more remote computing devices.

11. The method of claim 9, further comprising:
determining that the first electronic device is not communicatively coupled to the one or more remote computing devices; and
operating the first electronic device in the second mode based at least in part on determining that the first electronic device is not communicatively coupled to the one or more remote computing devices.

12. The method of claim 9, further comprising:
determining that the first electronic device is communicatively coupled to the second electronic device; and
operating the first electronic device in the second mode based at least in part on determining that the first electronic device is communicatively coupled to the second electronic device.

13. The method of claim 9, further comprising sending the second audio data to at least one of the second electronic device or a third electronic device.

14. The method of claim 9, further comprising:
determining that the first electronic device is communicatively coupled to the one or more remote computing devices;
operating the first electronic device in the first mode based at least in part on determining that the first electronic device is communicatively coupled to the one or more remote computing devices;
at least partly after generating the first audio data, determining that the first electronic device is not communicatively coupled to the one or more remote computing devices; and
operating the first electronic device in the second mode based at least in part on determining that the first electronic device is not communicatively coupled to the one or more remote computing devices.

15. A first electronic device, comprising:
one or more processors; and
one or more computer-readable media storing instructions that, when executed by the one or more processors, cause the one or more processors to perform operations comprising:
  operating the first electronic device in a first mode;
  generating, while operating the first electronic device in the first mode, first audio data representing user speech;
  determining that the first electronic device is not communicatively coupled to one or more remote computing devices;
  causing, based at least in part on determining that the first electronic device is not communicatively coupled to the one or more remote computing devices, the first electronic device to switch from operating in the first mode to operating in a second mode;
  receiving, while operating the first electronic device in the second mode, second audio data from a second electronic device; and
  outputting audible content represented by the second audio data.

16. The first electronic device of claim 15, the operations further comprising:
determining that the first electronic device is communicatively coupled to the one or more remote computing devices,
wherein operating the first electronic device in the first mode is based at least in part on determining that the first electronic device is communicatively coupled to the one or more remote computing devices.

17. The first electronic device of claim 15, the operations further comprising:
determining that the first electronic device is communicatively coupled to the second electronic device,
wherein operating the first electronic device in the second mode is further based at least in part on determining that the first electronic device is communicatively coupled to the second electronic device.

18. The first electronic device of claim 15, the operations further comprising:
sending the first audio data to the one or more remote computing devices;
receiving third audio data from the one or more remote computing devices based at least in part on sending the first audio data; and
sending the third audio data to the second electronic device.

19. The electronic device of claim 18, the operations further comprising outputting audible content represented by the third audio data.

20. The first electronic device of claim 15, wherein:
the first mode includes a voice-controlled mode where the first electronic device communicates with the one or more remote computing devices configured to analyze generated audio data; and
the second mode includes a peripheral mode where the first electronic device communicates with the second electronic device.

* * * * *